United States Patent
Fukushi et al.

(10) Patent No.: US 10,776,945 B2
(45) Date of Patent: Sep. 15, 2020

(54) DIMENSION MEASUREMENT DEVICE, DIMENSION MEASUREMENT SYSTEM, AND DIMENSION MEASUREMENT METHOD

(71) Applicant: NEC Corporation, Minato-ku, Tokyo (JP)

(72) Inventors: Kenichiro Fukushi, Tokyo (JP); Manabu Kusumoto, Tokyo (JP); Yoshio Kameda, Tokyo (JP); Hisashi Ishida, Tokyo (JP); Chenpin Hsu, Tokyo (JP); Takeo Nozaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/742,982

(22) PCT Filed: Jul. 19, 2016

(86) PCT No.: PCT/JP2016/003389
§ 371 (c)(1),
(2) Date: Jan. 9, 2018

(87) PCT Pub. No.: WO2017/013873
PCT Pub. Date: Jan. 26, 2017

(65) Prior Publication Data
US 2018/0225843 A1 Aug. 9, 2018

(30) Foreign Application Priority Data
Jul. 23, 2015 (JP) .................................. 2015-145623

(51) Int. Cl.
*G06T 7/73* (2017.01)
*G01B 11/02* (2006.01)
(Continued)

(52) U.S. Cl.
CPC ................ *G06T 7/74* (2017.01); *G01B 11/02* (2013.01); *G06T 1/0007* (2013.01); *H04N 2013/0081* (2013.01)

(58) Field of Classification Search
CPC ........... G01C 3/14; G06T 1/0007; G06T 7/74; H04N 2013/0081
See application file for complete search history.

(56) References Cited

U.S. PATENT DOCUMENTS

2006/0247891 A1 11/2006 Fox et al.
2010/0195114 A1* 8/2010 Mitsumoto .......... G01B 11/245
356/601
(Continued)

FOREIGN PATENT DOCUMENTS

JP  H06-059341 A   3/1994
JP  2002-286420 A  10/2002
(Continued)

OTHER PUBLICATIONS

International Search Report for PCT Application No. PCT/JP2016/003389, dated Oct. 18, 2016.
English translation of Written opinion for PCT Application No. PCT/JP2016/003389.

*Primary Examiner* — Ross Varndell

(57) ABSTRACT

Provided are a reference scale and dimension measurement system that make it possible to maintain accurate measurement even if the reference scale is not disposed or projected on a measurement surface. A dimension measurement device according to the present invention is provided with: a reference scale extraction means for extracting, from photographed image data including a reference scale that includes a film that has a pattern for displaying a length reference formed on the surface thereof and a lens that is in contact with the film, an image in which an image of the length reference is formed on the basis of the relationship between a pattern function expressing the length reference (Continued)

projected onto the lens according to variation in a prescribed angle between the reference scale and the optical axis of a photography device and an image formation color function indicating the image of the length reference formed on the imaging device; an object of measurement extraction means for extracting an object of measurement image from photographed image data including the reference scale; and a dimension calculation means for calculating a dimension of the object of measurement on the basis of a dimension of the image in which the image of the length reference is formed and the image of the object of measurement.

11 Claims, 11 Drawing Sheets

(51) Int. Cl.
*G06T 1/00* (2006.01)
*H04N 13/00* (2018.01)

(56) References Cited

U.S. PATENT DOCUMENTS

| 2010/0201809 | A1* | 8/2010 | Oyama | G01C 3/14 |
| | | | | 348/135 |
| 2012/0050487 | A1* | 3/2012 | Masumura | G02B 27/2214 |
| | | | | 348/46 |

FOREIGN PATENT DOCUMENTS

| JP | 2003-303222 | A | | 10/2003 |
|----|-------------|---|---|---------|
| JP | 2006-267879 | A | | 10/2006 |
| JP | 2007065441 | | * | 3/2007 |
| JP | 2008-539437 | A | | 11/2008 |
| JP | 2012-145559 | A | | 8/2012 |
| JP | 2013-113809 | A | | 6/2013 |
| JP | 2014-025748 | A | | 2/2014 |

* cited by examiner

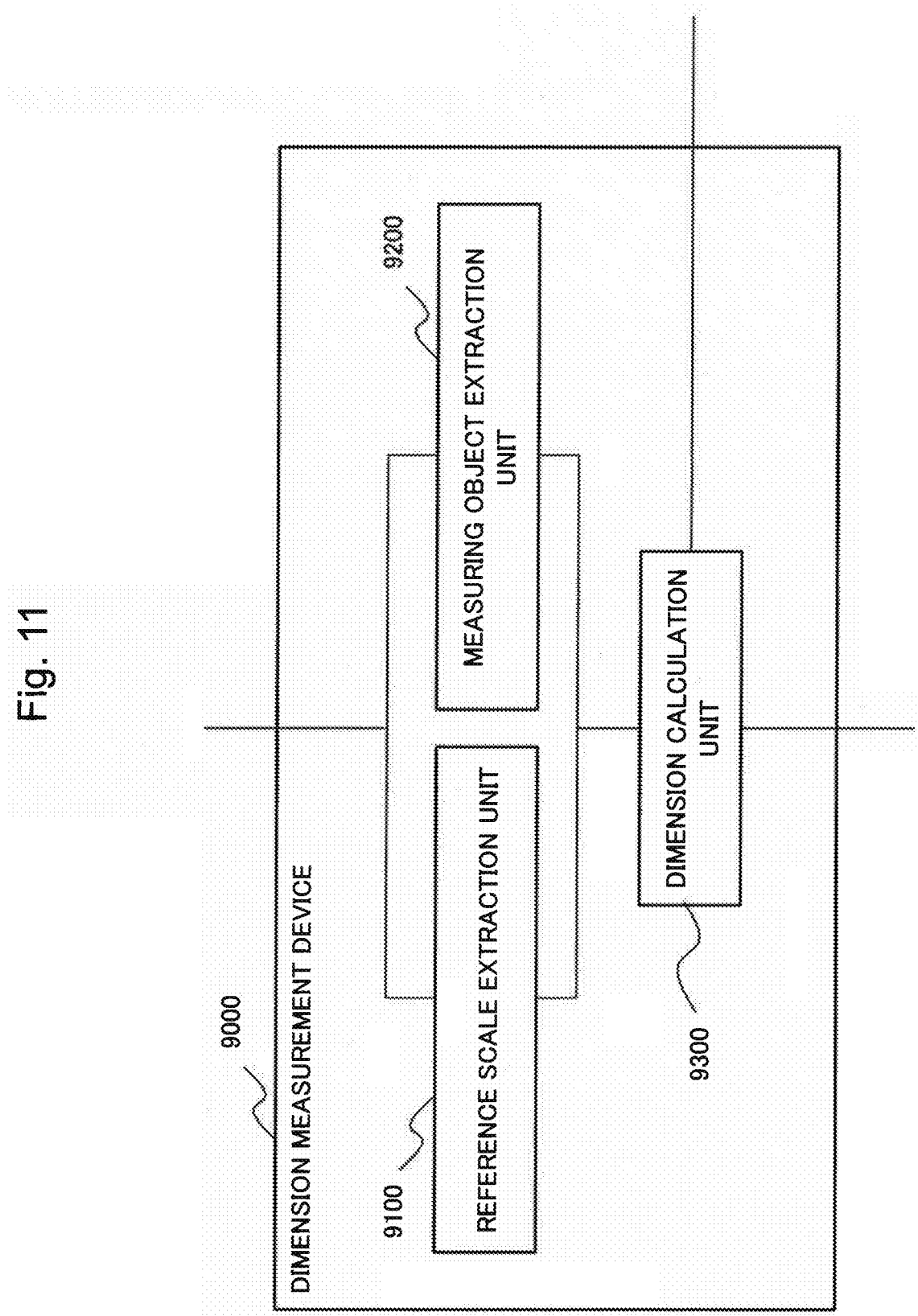

_US 10,776,945 B2_

DIMENSION MEASUREMENT DEVICE, DIMENSION MEASUREMENT SYSTEM, AND DIMENSION MEASUREMENT METHOD

This application is a National Stage Entry of PCT/JP2016/003389 filed on Jul. 19, 2016, which claims priority from Japanese Patent Application 2015-145623 filed on Jul. 23, 2015, the contents of all of which are incorporated herein by reference, in their entirety.

TECHNICAL FIELD

The present invention relates to a dimension measurement device, a dimension measurement system, and a dimension measurement method for measuring dimensions of an object.

BACKGROUND ART

A following method is proposed as a method for measuring an object using an image captured by a camera. Specifically, a measurer disposes or projects a marker (reference scale) having a pattern indicating a length reference in dimension on a measurement surface (a surface of a measuring object, or an extension plane of a measuring object), and captures an image of the reference scale and an object that is a measuring object by an imaging device, such as a camera, in such a manner that the reference scale and the object both fall within the image. Then, a measurement device calculates a ratio between the reference scale and the measuring object from data on the above-mentioned image, and calculates and outputs dimensions (a length, an area, a circumferential length, and the like) of the measuring object.

PTL 1 describes a method for accurately measuring dimensions by converting an image which is obliquely captured and indicates a rectangular marker with known dimensions on a measurement surface, into a front image.

PTL 2 describes a method for measuring dimensions of a rectangular parallelepiped by using a marker with known dimensions on a measurement surface.

PTL 3 describes a technique for measuring, by using a marker including a combination of a lenticular lens and a black and white pattern, a relative relationship (a position, an angle, and the like) between the marker and an observed object obtained by observing the marker, from a grayscale pattern of the marker.

CITATION LIST

Patent Literature

[PTL 1] Japanese Unexamined Patent Application Publication No. 2014-025748
[PTL 2] Japanese Unexamined Patent Application Publication No. 2003-303222
[PTL 3] Japanese Unexamined Patent Application Publication No. 2012-145559
[PTL 4] Japanese Translation of PCT International Application Publication No. 2008-539437
[PTL 5] Japanese Unexamined Patent Application Publication No. 2002-286420

SUMMARY OF INVENTION

Technical Problem

In PTL 1, an image obliquely captured can be converted into a front image. However, when the rectangular marker (reference scale) is neither disposed nor projected on a measurement surface (for example, deviates from the measurement surface), accuracy of measuring dimensions deteriorates.

PTL 2 describes a method for measuring dimensions of a rectangular parallelepiped by using a marker with known dimensions on a measurement surface. However, it is difficult to maintain dimension measurement accuracy when a reference scale is neither disposed nor projected on the measurement surface.

PTL 3 is a technique in which a marker including a combination of a lenticular lens and a black and white pattern is used to measure a relative relationship (a position, an angle, and the like) between the marker and an observed object obtained by observing the marker. However, PTL 3 is not a technique for accurately measuring dimensions of a measuring object.

In the case of measuring dimensions by the methods described in PTL 1 and PTL 2 described above, it is necessary to dispose or project a reference scale on a measurement surface. However, a case where it is difficult to dispose or project a reference scale on a measurement surface, and a case where the reference scale is inclined with respect to the measurement surface due to a change over time in a dimension measurement system are not assumed. There is a demand for a technique to measure dimensions without deteriorating measurement accuracy in the above-mentioned cases.

The present invention has been made to solve the above-mentioned problems, and an object of the present invention is to provide a dimension measurement device, a dimension measurement system, and a dimension measurement method which are capable of maintaining measurement accuracy even when a reference scale is neither disposed nor projected on a measurement surface.

Solution to Problem

A dimension measurement device comprising:
reference scale extraction means that extracts an image obtained by forming an image of a length reference from captured image data including a reference scale, based on a relationship between a pattern function and an image formation color function indicating the length reference whose image is formed on an imaging device, the pattern function indicating the length reference displayed on a lens depending on a change of a predetermined angle formed between an optical axis of the imaging device and the reference scale, the reference scale including a film having a pattern for displaying the length reference and the lens in contact with the film;
measuring object extraction means that extracts an image of a measuring object from captured image data including the reference scale;
and dimension calculation means that calculates dimensions of the measuring object, based on dimensions of an image obtained by forming an image of the length reference and an image of the measuring object.

A dimension measurement method comprising:
extracting an image obtained by forming an image of a length reference from captured image data including a reference scale, based on a relationship between a pattern function and an image formation color function indicating the length reference whose image is formed on an imaging device, the pattern function indicating the length reference displayed on a lens depending on a change of a predetermined angle formed between an optical axis of the imaging device and the reference scale, the reference scale including a film having a pattern for displaying the length reference and the lens in contact with the film;

extracting an image of a measuring object from captured image data including the reference scale; and calculating dimensions of the measuring object, based on dimensions of an image obtained by forming an image of the length reference and an image of the measuring object.

Advantageous Effects of Invention

According to a dimension measurement device of the present invention, an advantageous effect that measurement accuracy can be maintained even when a reference scale is neither disposed nor projected on a measurement surface can be obtained.

BRIEF DESCRIPTION OF DRAWINGS

FIG. 11 is a diagram illustrating an example of a configuration of a dimension measurement device according to a sixth example embodiment of the present invention.

DESCRIPTION OF EMBODIMENTS

First Exemplary Embodiment

A first example embodiment of the present invention will be described in detail with reference to the drawings.

Figure 3:
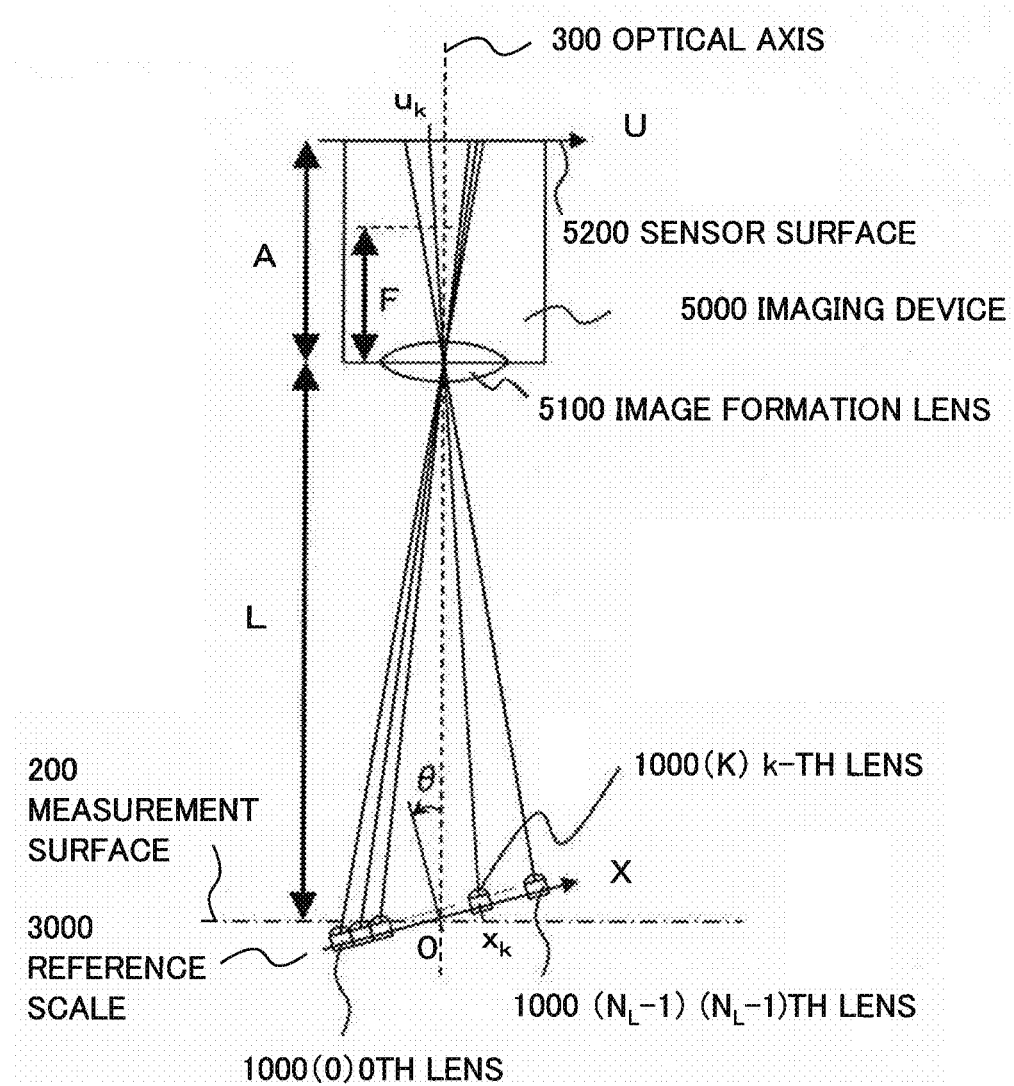
FIG. 3 is a diagram for illustrating the principle of the reference scale according to the first example embodiment of the present invention.
Figure 4:
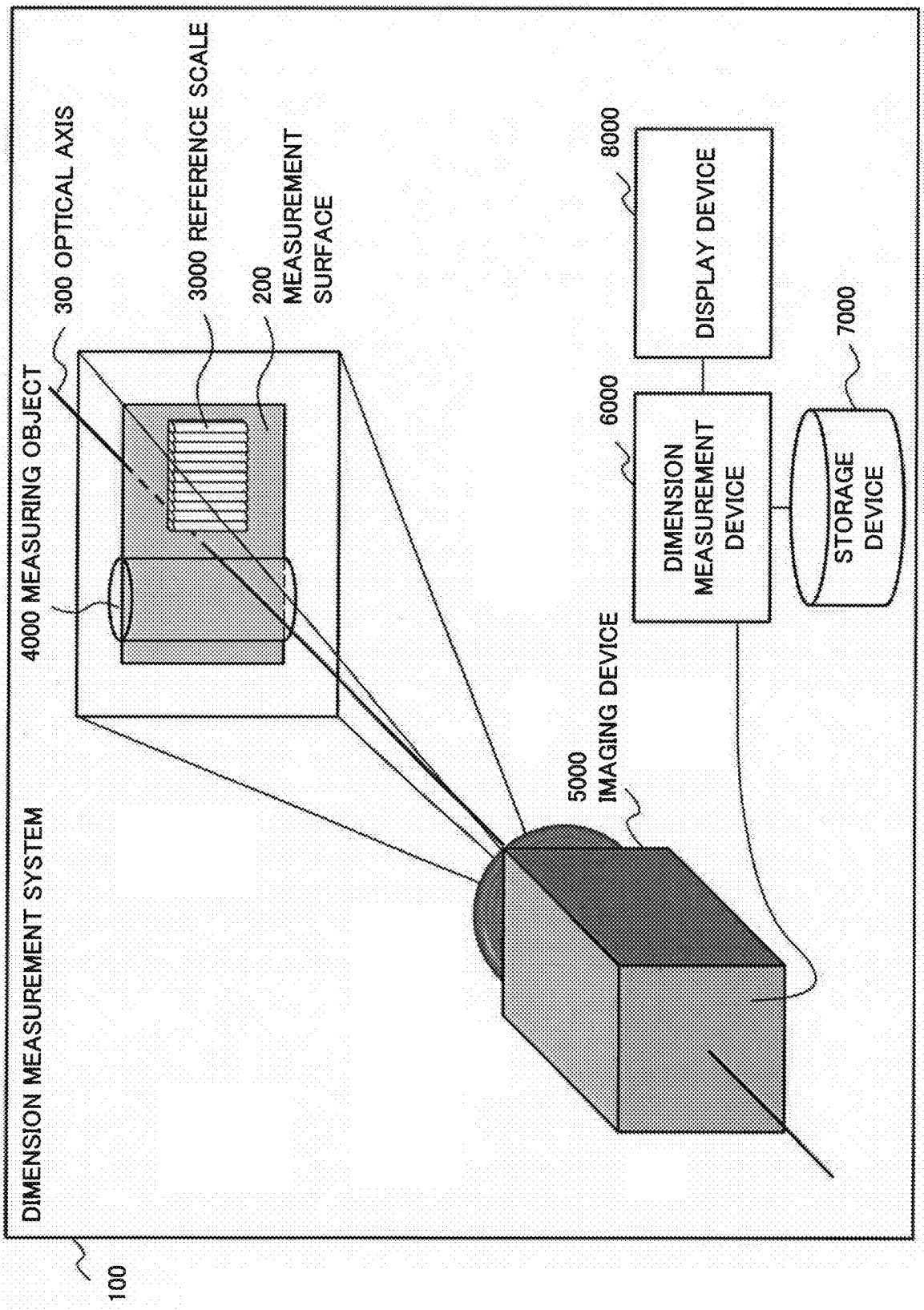
FIG. 4 is a diagram illustrating an example of a dimension measurement system using the reference scale according to the first example embodiment of the present invention.

The first example embodiment is directed to a dimension measurement system 100 (FIG. 4). Hereinafter, a reference scale 3000 is mainly described with reference to FIGS. 1 to 3 and then the entire dimension measurement system 100 is described with reference to FIG. 4 to FIG. 6. The reference scale 3000 and the dimension measurement system 100 according to the present invention are not limited to the configurations and processing illustrated in FIGS. 1 to 6.

Figure 1:
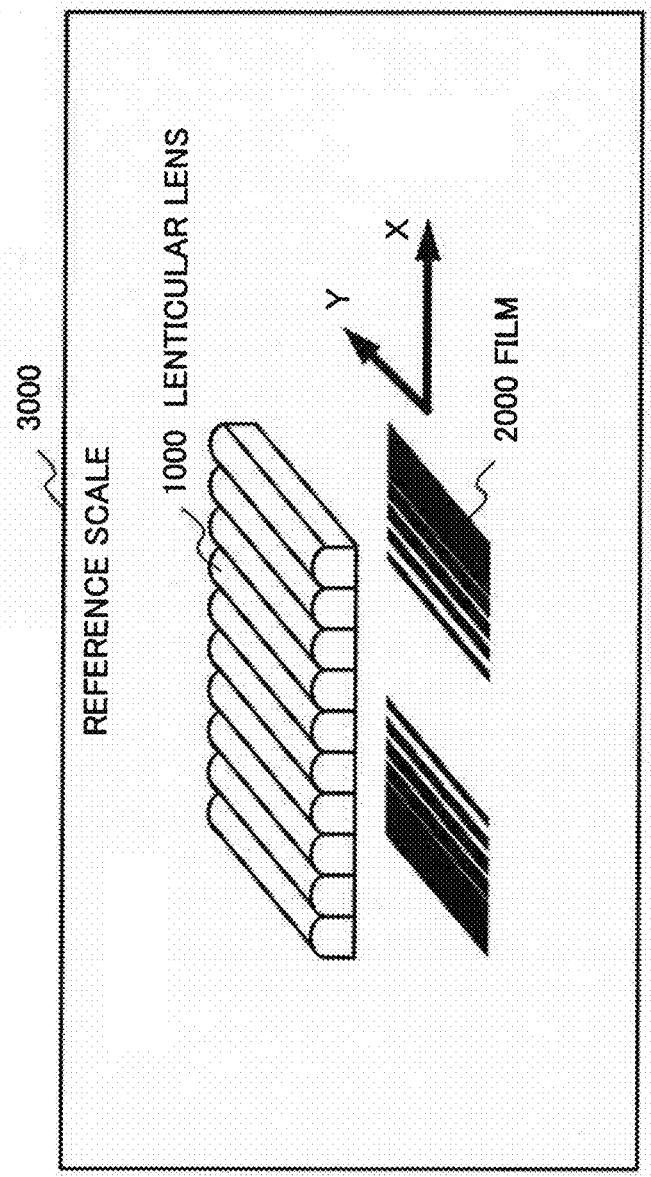
FIG. 1 is a diagram illustrating an example of a configuration of a reference scale according to a first example embodiment of the present invention.

FIG. 1 is a diagram illustrating an example of a configuration of a reference scale 3000 according to the first example embodiment.

As illustrated in FIG. 1, the reference scale 3000 according to this example embodiment includes a film 2000 and a lenticular lens 1000 which is attached onto an upper surface of the film 2000.

The film 2000 is a thin-film member having a surface on which a pattern of a predetermined black pattern is formed by printing or the like on a white film member, or a thin-film member having a surface on which a pattern of a predetermined white pattern is formed by printing or the like on a black film member. The film 2000 may be formed by a combination of white and black films, or by forming a pattern by polarization using a combination of polarizing plates having different polarization directions. The pattern of the film 2000 may be displayed on a liquid crystal monitor. The configuration of the film 2000 and the method for forming the pattern of the film 2000 are not limited to those illustrated in FIG. 1.

The film 2000 may be disposed at a focal length of the lenticular lens 1000 from an optical center thereof. However, in actual use, the location where the film 2000 is disposed may deviate from the focal length within an allowable range of measurement errors. Referring to FIG. 1, the lenticular lens 1000 is used as an example of the lens of the reference scale 3000. However, the lens used for the reference scale 3000 according to this example embodiment is not limited to this lens.

The principle that variations in the pattern on the film 2000 indicating a length reference observed from a viewpoint of an imaging device 5000 (see FIG. 3) is reduced even when the reference scale 3000 according to this example embodiment is disposed with an inclination with respect to a measurement surface 200 (see FIG. 3), or the angle formed between the reference scale 3000 and the measurement surface 200 changes due to a change over time will be described.

Figure 2:
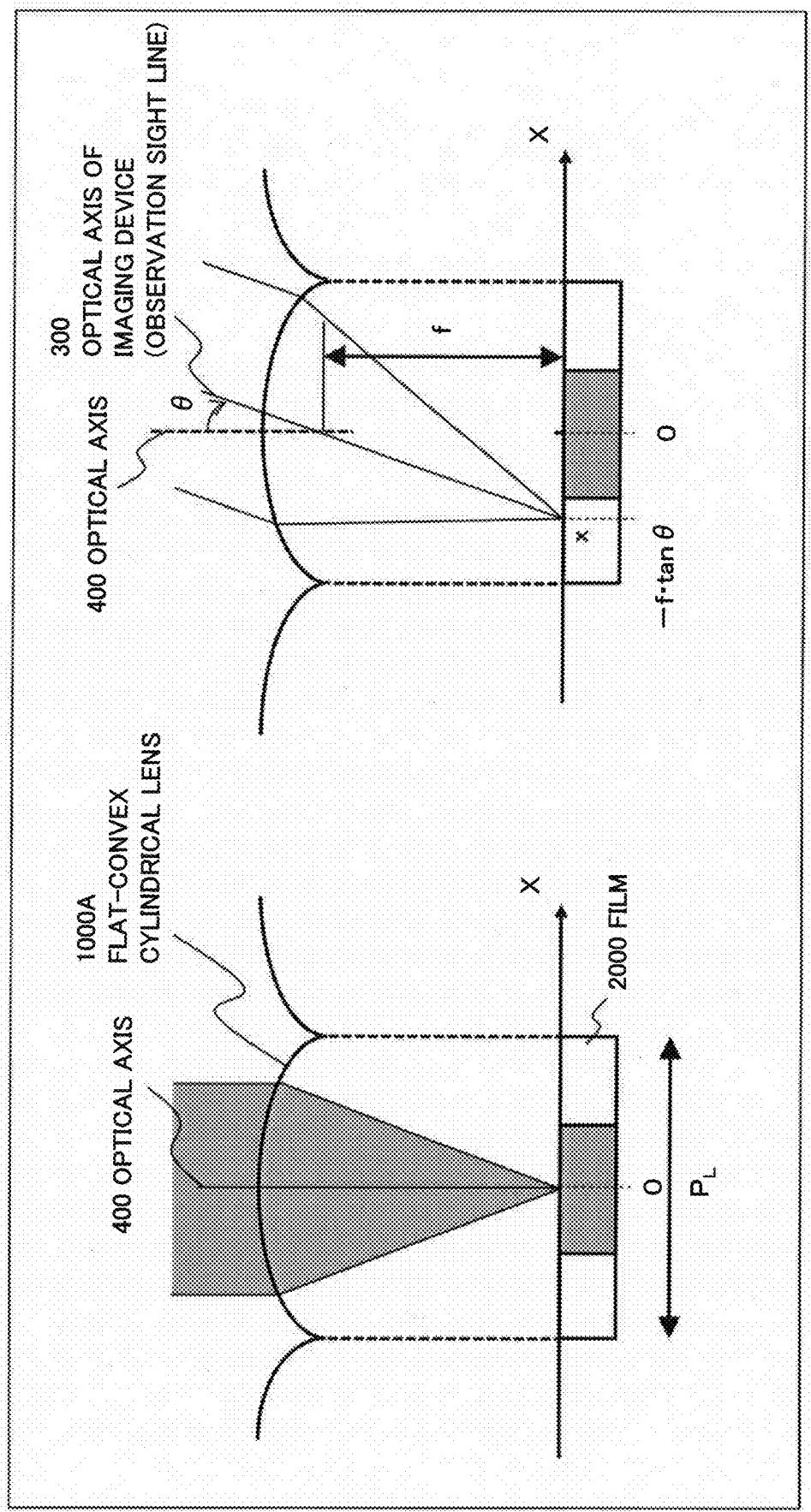
FIG. 2 is an enlarged sectional view illustrating a part of the reference scale according to the first example embodiment of the present invention.

FIG. 2 is an enlarged sectional view illustrating a part of the reference scale 3000 according to the first example embodiment of the present invention.

Referring first to FIG. 2 and focusing on one flat-convex cylindrical lens 1000A of the lenticular lens 1000, a positional relationship between a sight line angle and an enlarged pattern displayed on the lens will be described in detail.

The lenticular lens 1000 has a structure in which a large number of flat-convex cylindrical lenses 1000A are arranged in one direction. FIG. 2 is a sectional view illustrating a surface orthogonal to a generatrix direction in one flat-convex cylindrical lens (hereinafter, also referred to simply as a lens) 1000A of the lenticular lens 1000. A generatrix refers to an axis that is parallel to a Y-axis in FIG. 1 in a direction in which image formation ability of the flat-convex cylindrical lens 1000A is not present.

It is assumed that a lens pitch is represented by $P_L$ and a focal length is represented by f. As described above, the film 2000 (specifically, the pattern of the film 2000) may be disposed at a position of the focal length f of the lens from the optical center thereof. Accordingly, in the following discussion, it is assumed that the lenticular lens 1000 having the focal length f is used and the reference scale 3000 has a configuration in which the film 2000 is disposed immediately below the lenticular lens 1000. An X-axis is set in a direction orthogonal to the generatrix direction on a bottom surface of the lenticular lens 1000, and a coordinate system is determined in such a manner that an intersection between an optical axis 400 and the bottom surface of the lenticular lens 1000 is set as an origin O. When an angle (sight line angle) formed between an observation sight line (an optical axis 300 of the imaging device 5000 illustrated in FIG. 3) and the optical axis 400 is represented by θ, the following formula is established at a position x on the X-axis of the film 2000 that is enlarged and displayed on the lens.

[Formula 1]

$$x = -f \cdot \tan \theta \quad (1)$$

As illustrated on the left side of FIG. 2, a state where the sight line angle is the same as the optical axis 400 of the lenticular lens 1000 and is vertical to the reference scale 3000 corresponds to θ=0 (deg), and thus the pattern of the film 2000 at a position of x=−f·tan θ=0 is enlarged and displayed on the lens 1000A.

As illustrated on the right side of FIG. 2, when an angle θ is set in such a manner that the sight line angle is not 0 (deg), the pattern located at the position of x=−f·tan θ is enlarged and displayed on the lens 1000A.

Next, a behavior of the reference scale 3000 when a plurality of lenses constituting the lenticular lens 1000 are considered will be described with reference to FIG. 3. FIG. 3 is a diagram for illustrating the principle of the reference scale 3000 according to the first example embodiment of the present invention.

Referring to FIG. 3, the reference scale 3000 is installed with an inclination of the angle θ with respect to the measurement surface 200, and is observed by the imaging device 5000 from a position apart from a distance L from the measurement surface 200. It is assumed that the optical axis 300 of the imaging device 5000 is vertical to the measurement surface 200. Description is made here by using a camera as the imaging device 5000, but the camera is merely an example and not limited, and the reference scale may be observed with human eyes. In the imaging device 5000, a distance A between an image formation lens 5100 and a sensor surface 5200 is adjusted so that the imaging device 5000 comes into focus on a plane of the distance L. Specifically, when the focal length of the image formation lens 5100 is represented by F, the following formula

[Formula 2]

$$\frac{1}{A} + \frac{1}{L} = \frac{1}{F} \quad (2)$$

is satisfied for the lens of the imaging device 5000.

In FIG. 3, a U-axis is an axis in a direction along the sensor surface 5200. An origin in the coordinate system is an intersection between the optical axis 300 and the measurement surface 200. The total number of lenses of the lenticular lens 1000 of the reference scale 3000 according to this example embodiment is represented by $N_L$, and the lenses are assigned numbers of 0 to ($N_L$−1) in order from the lens 1000A which is located at one end of the lenticular lens 1000, (0th lens 1000 (0) to ($N_L$−1)th lens 1000($N_L$−1)). The X-axis is set on the bottom surface of the lenticular lens 1000, and the coordinate system in which the center position of the reference scale 3000 is set as an origin is determined.

A position (coordinates) $x_k$ on the X-axis of the k-th lens 1000(K) is expressed by the following formula using a lens pitch $P_L$.

[Formula 3]

$$x_k = \left( k - \frac{N_L - 1}{2} \right) \cdot P_L \quad (3)$$

As discussed above, the lenticular lens 1000 has a function of enlarging and displaying different positions on the X-axis of the pattern of the film 2000 below the lenticular lens 1000 according to the angle of the observation sight line. When the formula (1) is used, it is obvious that when the sight line angle is θ, the pattern located at a position $x_k$−f·tan θ on the X-axis is enlarged and displayed on the k-th lens 1000(K). The color of the pattern located at this position is represented by $C(x_k − f \cdot \tan \theta)$. $C(x_k − f \cdot \tan \theta)$ is also referred to as a pattern function C.

Next, in the imaging device 5000, at which position on the sensor surface 5200 the image of the pattern of the film 2000 that is enlarged and displayed on the lenticular lens 1000 is formed will be described continuously with reference to FIG. 3. The angle θ formed between the optical axis 300 of the imaging device 5000 and the optical axis 400 of the lenticular lens 1000 corresponds to the sight line angle θ that is discussed above with reference to FIG. 2. The optical center position $x_k$ of the k-th lens 1000(K) is focused at a position $u_k$ on the U-axis given by the following formula in consideration of the sight line angle θ.

[Formula 4]

$$u_k = \frac{F}{L - F} x_k \cos \theta \quad (4)$$

Formula (4) is approximated assuming that a value $x_k \cdot \cos \theta$, which is generated when the reference scale 3000 is inclined with the angle θ, is sufficiently smaller than the distance L between the imaging device 5000 and the measurement surface 200 (L>>$x_k$·cos θ). A color of an image formed at this position on the sensor surface 5200 is represented by $H(u_k)$. The image formed on the sensor surface 5200 is subjected to, for example, spectroscopic processing or analog-to-digital conversion processing using a camera by the dimension measurement system 100 described below, and is then subjected to image processing such as demosaicing or noise removal and converted into a final observation value. If the sensor surface 5200 is a human eye, the sensor corresponds to a retina. An image formed on the retina becomes an electric signal by optic cells and the electric signal is subjected to processing in a visual cortex and is then converted into an observation value that is perceived by a human. The observation value that is subjected to the conversion and located at the position "u" on the sensor surface 5200 is represented by I(u). An observation value function can be considered assuming that, for example, the observation value represented by I(u) is "1" when the color of an image formed at the position "u" on the sensor surface 5200 is white, and is "0" when the color of the image is black. The observation value function having two values as described above is illustrated by way of example. The observation value may be a scalar value such as a luminance value, or a vector value such as a RGB (Red Green Blue) color value, or an HSV (Hue Saturation Value) color value. In addition, the observation value may be an optical physical quantity such as a light wavelength, a phase, polarization characteristics, a radiant intensity, or a modulation amount, or a psychophysical quantity such as a definition or glossiness, and thus the observation value is not limited.

It is assumed herein that a given observation value function Ω(u) is predetermined and an image formation color function H(u) corresponding to the observation value function can be also calculated in advance. The image of the pattern that is enlarged and displayed on the k-th lens 1000(K) of the reference scale 3000 is formed at the position $u_k$ on the U-axis represented by Formula (4). Even when the reference scale 3000 is disposed with an inclination with reference to the measurement surface 200, or the positional relationship between the reference scale 3000 and the measurement surface 200 is changed due to a change over time, in order to reduce variations in the pattern indicating the length reference observed from the viewpoint of the imaging device 5000, i.e., the actual observation value I(u), the pattern of the film 2000 may be determined in such a manner that the color of pattern (pattern function C) that is enlarged and displayed on the lenticular lens 1000 of the reference scale 3000 and an image formation color function $H(u_k)$ satisfy the following relational expression.

[Formula 5]

$$C(x_k - f \tan \theta) = H(u_k))  \quad (5)$$

The position where the lenticular lens 1000 forms an image of the pattern on the sensor surface 5200 is discrete (see Formula (6)).

[Formula 6]

$$u = \{u_0, u_1, \ldots, u_{N_{L-1}}\} \quad (6)$$

Accordingly, the lenticular lens 1000 having the lens pitch $P_L$ of a sufficiently small value may be selected so that the actual observation value I(u) has a sufficient resolution with respect to the given observation value function Ω(u).

A method for designing the pattern function C in such a manner that variations in the pattern indicating the length reference observed from the viewpoint of the imaging device 5000 is reduced even when the reference scale 3000 is disposed with an inclination with respect to the measurement surface 200, or the angle formed between the reference scale 3000 and the measurement surface 200 is changed due to a change over time will be described below.

It is assumed that the pattern indicating the length reference is a white belt-like pattern having a width of 10 cm on a black background. It is also assumed that a camera is used as the imaging device 5000. It is assumed that the focal length of the image formation lens 5100 in the imaging device 5000 is F=75 mm and the distance between the imaging device 5000 and the measurement surface 200 is L=3 m.

An image sensor of the imaging device 5000 has black and white 256 tones and a pixel size of a 2.5 μm square lattice shape. Parameters described herein are examples for explanation and are not limited to these values.

Under the conditions described above, the white belt-like pattern having a width of 10 cm corresponds to the following formula.

[Formula 7]

$$\frac{F}{L-F} \times 10 \times 10^{-2} \times \frac{1}{2.5 \times 10^{-6}} \approx 1000 \text{ (pixels)} \quad (7)$$

The size of the formed image on the sensor surface 5200 is 2.5 mm. It is assumed that the observation value function Ω(u) has a predetermined threshold for a pixel value of captured image data, and the function is "1" for the threshold or more and is "0" for other values. According to this function, the given observation value function Ω(u) is defined as follows.

[Formula 8]

$$\Omega(u) = \begin{cases} 1 & -1.25 < u \le 1.25 \\ 0 & \text{otherwise} \end{cases} \quad (8)$$

Each of −1.25 and 1.25 are expressed in units of mm and represents a length from a right boundary to a left boundary when u=0 is the central position because, as described above, the size of the image obtained by forming an image of the white belt-like pattern is 2.5 mm.

The corresponding image formation color function H(u) is expressed by the following formula.

[Formula 9]

$$H(u) = \begin{cases} \text{white} & -1.25 < u \le 1.25 \\ \text{black} & \text{otherwise} \end{cases} \quad (9)$$

When Formula (5) is used, the pattern function $C(x_k - f \cdot \tan \theta)$ is obtained as follows.

[Formula 10]

$$C(x_k - f \tan \theta) = \begin{cases} \text{white} & -1.25 < u_k \le 1.25 \\ \text{black} & \text{otherwise} \end{cases} \quad (10)$$

Thus, the pattern function is defined by the position $x_k - f \cdot \tan \theta$ on the pattern enlarged and displayed by the lens 1000(K), and the value of the image formation color function $H(u_k)$ at the position $u_k$ where the image is formed on the sensor surface 5200 of the lens 1000(K).

As described above, the reference scale 3000 according to this example embodiment is characterized by including a film having the pattern determined by the pattern function C, and the lenticular lens 1000 disposed on the film. The pattern function of the pattern is a function of one variable defined in the direction orthogonal to the generatrix direction of the lenticular lens 1000. The pattern formed at the position enlarged and displayed by the lens 1000(K) is a given image formation pattern defined at the image formation position of the lens 1000(K) in the imaging device 5000. Accordingly, the pattern of the film 2000 is a one-dimensional pattern. It is considered that the pattern indicating the length reference to be observed is, for example, a striped one-dimensional pattern.

With this configuration, when the angle between the reference scale 3000 and the measurement surface 200 is changed about the axis in the generatrix direction of the lenticular lens 1000, the reference scale 3000 enlarges and displays different positions of the pattern of the film 2000 disposed below the lenticular lens 1000 by the function of the lenticular lens 1000. Thus, variations in the pattern indicating the length reference to be observed in the imaging device 5000, i.e., the observation value I(u), are suppressed.

As described above, according to the reference scale 3000, even when the angle between the reference scale 3000 and the measurement surface 200 is changed about the axis in the generatrix direction of the lenticular lens 1000, variations in the pattern indicating the length reference to be observed in the imaging device 5000. Consequently, an advantageous effect that dimension measurement accuracy can be continuously maintained even when the reference scale 3000 is disposed with an inclination with respect to the measurement surface 200, or the angle between the reference scale 3000 and the measurement surface 200 is changed about the axis in the generatrix direction of the lenticular lens 1000 due to a change over time can be obtained.

FIG. 4 is a diagram illustrating an example of the dimension measurement system 100 using the reference scale 3000 according to the first example embodiment.

As illustrated in FIG. 4, a dimension measurement system 100 is a system for measuring dimensions of a measuring object 4000. As illustrated in FIG. 4, the dimension measurement system 100 includes a reference scale 3000, the measuring object 4000, an imaging device 5000, a dimension measurement device 6000, a storage device 7000, and a display device 8000. As illustrated in FIG. 4, an optical axis 300 of the imaging device 5000 is installed vertically to a measurement surface 200. The measurement surface 200 indicates a surface or section on which measurement of the measuring object 4000 is performed, or an extension plane thereof. The reference scale 3000 may be installed in such a manner that a bottom surface of the reference scale 3000 is disposed on the measurement surface 200. However, the position of the reference scale may deviate in the direction of the optical axis 300 of the imaging device 5000 within the allowable range of measurement errors in actual use.

The devices are connected to each other by using, for example, a LAN (Local Area Network) cable or the like. This example embodiment is not limited to this, but instead the devices may be connected to each other wirelessly.

The imaging device 5000 is a device that captures images of the reference scale 3000 and the measuring object 4000. The imaging device 5000 is implemented by, for example, a general digital camera, web camera, or the like which is capable of outputting image data having a number of pixels enough to observe an image region including the measuring object 4000 and the reference scale 3000. The imaging device 5000 is implemented by, for example, a web camera including a CCD (Charge Coupled Device) image sensor or a CMOS (Complementary Metal-Oxide-Semiconductor) image sensor having 1920×1080 pixels to be output, or the like, but the present invention is not limited to this. FIG. 4 illustrates a configuration in which images of the reference scale 3000 and the measuring object 4000 are simultaneously captured, but the present invention is not limited to this configuration. Images of the reference scale 3000 and the measuring object 4000 may be captured at different timings. The imaging device 5000 transmits image data (captured image data) indicating the captured images of the reference scale 3000 and the measuring object 4000 to the dimension measurement device 6000.

The dimension measurement device 6000 receives the captured image data from the imaging device 5000. The dimension measurement device 6000 measures dimensions of the measuring object 4000 by using the received captured image data. A specific functional configuration of the dimension measurement device 6000 will be described with reference to FIG. 5 by changing the drawing.

The storage device 7000 is a device in which the dimensions of the reference scale 3000 are stored in advance.

The dimensions of the reference scale 3000 indicate actual dimension values (in units of, for example, cm) of the pattern indicating the length reference to be observed. For example, the pattern defined by the pattern function as illustrated above stores information indicating that "a white belt-like region has a length of 10 cm".

The display device 8000 is a means that displays processing results of the dimension measurement device 6000, or image data captured by the imaging device 5000.

Figure 5:
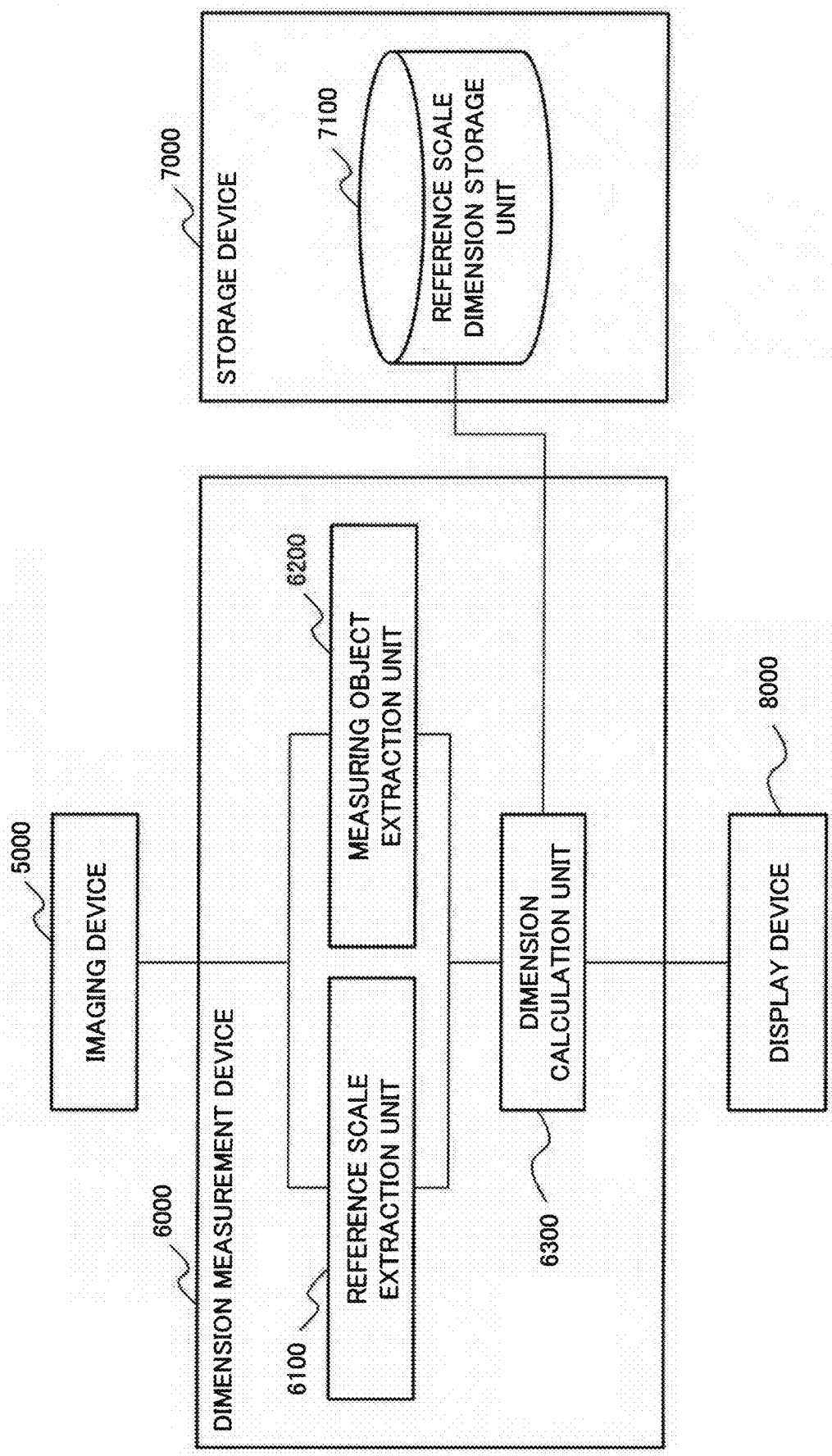
FIG. 5 is a functional block diagram illustrating an example of a functional configuration of each of a dimension measurement device and a storage device in the dimension measurement system according to the first example embodiment of the present invention.

Referring next to FIG. 5, the functional configuration of the dimension measurement device 6000 according to this example embodiment will be described. FIG. 5 is a functional block diagram illustrating an example of each functional configuration of the dimension measurement device 6000 and the storage device 7000 in a dimension measurement system 100 according to this example embodiment. FIG. 5 also illustrates the imaging device 5000 and the display device 8000.

As illustrated in FIG. 5, the dimension measurement device 6000 includes a reference scale extraction unit 6100, a measuring object extraction unit 6200, and a dimension calculation unit 6300.

The reference scale extraction unit 6100 receives captured image data from the imaging device 5000.

The reference scale extraction unit 6100 extracts an image region (also referred to as an observed pattern) of the pattern of the film 2000 indicating the length reference displayed on the lenticular lens 1000 of the reference scale 3000 from the captured image represented by the received captured image data. Specifically, the reference scale extraction unit 6100 distinguishes the above-mentioned captured image from the observed pattern and other regions by using color information, and extracts the region distinguished as the above-mentioned observed pattern from the captured image data. As the observed pattern of the reference scale 3000, an example in which a white belt-like pattern is formed on a black background and two values are taken is illustrated in the design of the above-mentioned pattern function. Accordingly, the reference scale extraction unit 6100 may extract the above-mentioned observed pattern by using the features of the colors and the pattern for the extraction processing described above. Alternatively, the observed pattern may be extracted by a manual operation using image analysis software. The observed pattern extraction processing performed by the reference scale extraction unit 6100 uses a general method, and thus the description thereof is omitted in this example embodiment.

The measuring object extraction unit 6200 receives captured image data from the imaging device 5000. The measuring object extraction unit 6200 extracts the image region of the measuring object 4000 from the captured image represented by the received captured image data. Specifically, the measuring object extraction unit 6200 distinguishes the above-mentioned captured image from the measuring object 4000 and other regions by using color information, and extracts the region distinguished as the above-mentioned measuring object 4000 from the captured image data. Alternatively, the image region of the measuring object 4000 may be extracted by a manual operation using the image analysis software. The processing for extracting the measuring object 4000 performed by the measuring object extraction unit 6200 is not particularly limited and a general method is used. Accordingly, the description thereof is omitted in this example embodiment.

The dimension calculation unit 6300 receives the image regions of the observed pattern generated by the reference scale extraction unit 6100 and the measuring object 4000 generated by the measuring object extraction unit 6200 from the reference scale extraction unit 6100 and the measuring object extraction unit 6200, respectively. In general, for example, when the imaging device 5000 is a camera, pixels are used as the units of image data representing the image regions of the observed pattern and the measuring object 4000. The dimensions of the observed pattern are represented by $S_P$ (pixels), and the dimensions of the measuring object 4000 are represented by $W_P$ (pixels). The actual dimension values of the measuring object 4000 are represented by $W_R$ (cm). The units of the actual dimension values are cm. However, this is merely an example and the units of the actual dimension values are not limited. The dimension calculation unit 6300 is intended to calculate the actual dimension values $W_R$ of the measuring object 4000. Accordingly, the dimension calculation unit 6300 refers to the dimensions of the reference scale 3000 stored in the storage device 7000 (reference scale dimension storage unit 7100). The dimensions of the reference scale 3000 are actual dimension values $S_R$ (cm) of the pattern indicating the length reference to be observed. The actual dimension values $W_R$ of the measuring object 4000 can be calculated by the following formula.

[Formula 11]

$$W_R = \frac{S_R}{S_P} W_P \quad (11)$$

The dimension calculation unit 6300 supplies the calculated actual dimension value $W_R$ of the measuring object 4000 to the display device 8000.

In this case, the reference scale extraction unit 6100, the measuring object extraction unit 6200, and the dimension calculation unit 6300 are composed of, for example, hardware circuits such as logic circuits.

The storage device 7000 (reference scale dimension storage unit 7100) is composed of, for example, a storage device such as a disk device or a semiconductor memory.

The display device 8000 is composed of, for example, a display.

Figure 6:
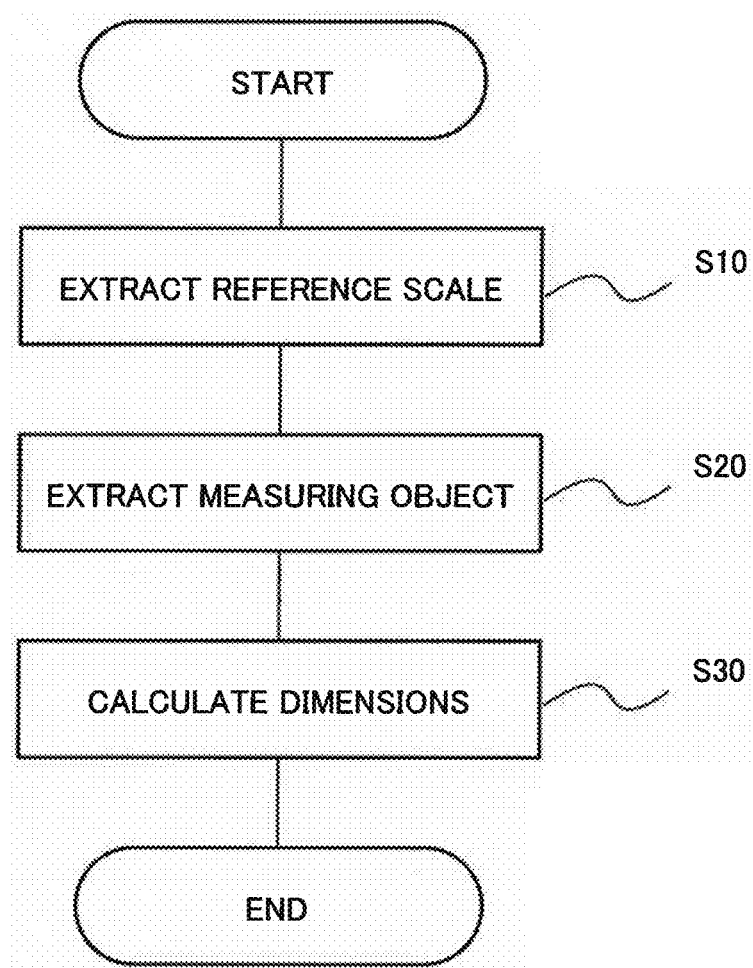
FIG. 6 is a diagram illustrating an example of a processing flow in the dimension measurement device according to the first example embodiment of the present invention.

Referring next to FIG. 6, an operation of the dimension measurement system 100 according to this example embodiment in the dimension measurement device 6000 will be described. FIG. 6 is a diagram illustrating an example of a processing flow in the dimension measurement device 6000.

As illustrated in FIG. 6, the reference scale extraction unit 6100 extracts, from the captured image data transmitted from the imaging device 5000, the observed pattern (the image region of the pattern indicating the length reference displayed on the lenticular lens 1000 of the reference scale 3000) (step S10).

Next, the measuring object extraction unit 6200 extracts the image region of the measuring object 4000 from the captured image data transmitted from the imaging device 5000 (step S20).

Next, the dimension calculation unit 6300 calculates the actual dimension values of the measuring object 4000 from the actual dimension values $S_R$ of the observed pattern of the reference scale stored in the storage device 7000, the observed pattern extracted in step S10, and the image region of the measuring object 4000 extracted in step S20 (step S30).

This processing allows the dimension measurement device 6000 to measure the dimensions of the measuring object 4000 as actual dimension values.

As described above, according to the dimension measurement system 100 of this example embodiment, an advantageous effect that the measurement accuracy can be maintained even when the reference scale 3000 is neither disposed nor projected on the measurement surface is obtained.

This is because the dimension measurement system 100 includes the following configuration. First, the dimension measurement system 100 includes the reference scale 3000 including both the film 2000 having the pattern for displaying the length reference and the lenticular lens 1000 in contact with the film 2000. Second, the reference scale extraction unit 6100 of the dimension measurement device 6000 utilizes the relationship between the pattern function indicating the length reference displayed on the lens according to a change of a predetermined angle formed between the reference scale and the optical axis 300 of the imaging device 5000, and the image formation color function indicating the length reference whose image is formed on the imaging device. Specifically, the reference scale extraction unit 6100 extracts the image of the length reference formed on the imaging device from the captured image data including the reference scale 3000, based on the relationship.

Second Exemplary Embodiment

Next, a second example embodiment of the present invention will be described in detail with reference to the drawings.

Figure 7:
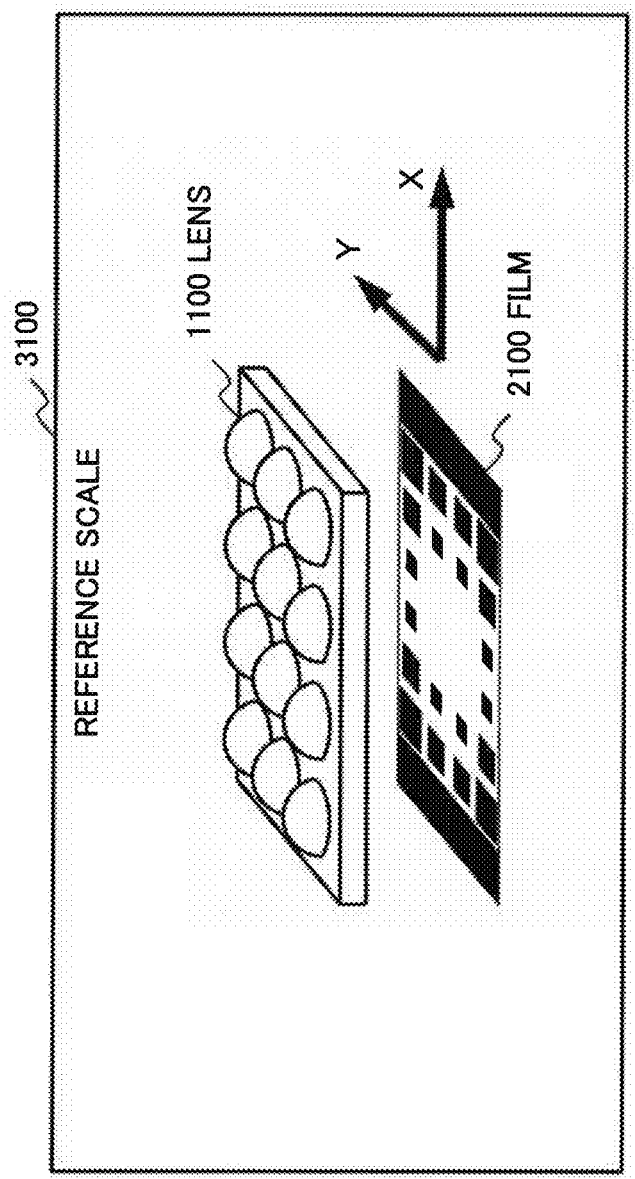
FIG. 7 is a diagram illustrating an example of a configuration of a reference scale according to a second example embodiment according to the present invention.

FIG. 7 is a diagram illustrating an example of a configuration of a reference scale 3100 according to the second example embodiment.

It is assumed that the reference scale 3100 operates in the dimension measurement system 100 like in the first example embodiment.

As illustrated in FIG. 7, the reference scale 3100 according to this example embodiment includes a film 2100 on which a pattern is formed, and a lens 1100 which is attached onto an upper surface of the film 2100. The film 2100 may be disposed at the position of the focal length of the lens 1100 from the optical center thereof. However, the location where the film 2100 is disposed may deviate from the focal length within the allowable range of measurement errors in actual use. While FIG. 7 illustrates that a lens array is used as an example of the lens 1100, the lens 1100 used for the reference scale 3100 according to this example embodiment is not limited to this.

Differences between the reference scale 3000 illustrated in FIG. 1 and the reference scale 3100 in FIG. 7 will be described. The pattern function of the film 2000 of the reference scale 3000 illustrated in FIG. 1 is a function of one variable defined in the direction orthogonal to the generatrix direction of the lenticular lens. However, the pattern function of the film 2100 of the reference scale 3100 illustrated in FIG. 7 is a two-variable function defined on a plane containing the X-axis and the Y-axis. The pattern function is a given image formation color function in which the pattern at the position enlarged and displayed by the lens 1100 is defined at the image formation position in the imaging device 5000 of the lens 1100. Accordingly, the pattern of the film 2100 is a two-dimensional pattern. The pattern indicating the length reference to be observed can be, for example, a checker board-like two-dimensional pattern.

As described above, according to the reference scale 3100 of this example embodiment, variations in the pattern on the film 2100 indicating the length reference to be observed in the imaging device 5000 is suppressed even when the reference scale 3000 is disposed with an inclination with respect to the measurement surface 200, or the angle formed between the reference scale 3100 and the measurement surface 200 is changed due to a change over time. In the reference scale 3000 illustrated in FIG. 1, the advantageous effect that variations in the pattern indicating the length reference to be observed in the imaging device 5000 are suppressed is obtained only for a change in the angle about one axis only in the generatrix direction of the lens, while in the reference scale 3100 according to this example embodiment, this advantageous effect can be obtained even for both changes in angles about the X-axis and the Y-axis.

This is because the lens 1100 has a shape with which an advantageous effect similar to that of the lenticular lens can be obtained on a section on the X-axis as well as on a section of the Y-axis, and can obtain an advantageous effect similar to that of the first example embodiment.

According to the reference scale 3100 of this example embodiment, an advantageous effect that the measurement accuracy can be maintained even when the reference scale 3100 is neither disposed nor projected on the measurement surface, can be obtained even for both changes in angles about the X-axis and the Y-axis.

This is because the pattern function of the film 2100 of the reference scale 3100 is a two-variable function defined on a plane containing the X-axis and the Y-axis. Also, it is because the lens 1100 has a shape with which an advantageous effect similar to that of the lenticular lens can be obtained on a section on the X-axis as well as on a section of the Y-axis.

Third Exemplary Embodiment

Next, a third example embodiment of the present invention will be described in detail with reference to the drawings.

Figure 8:
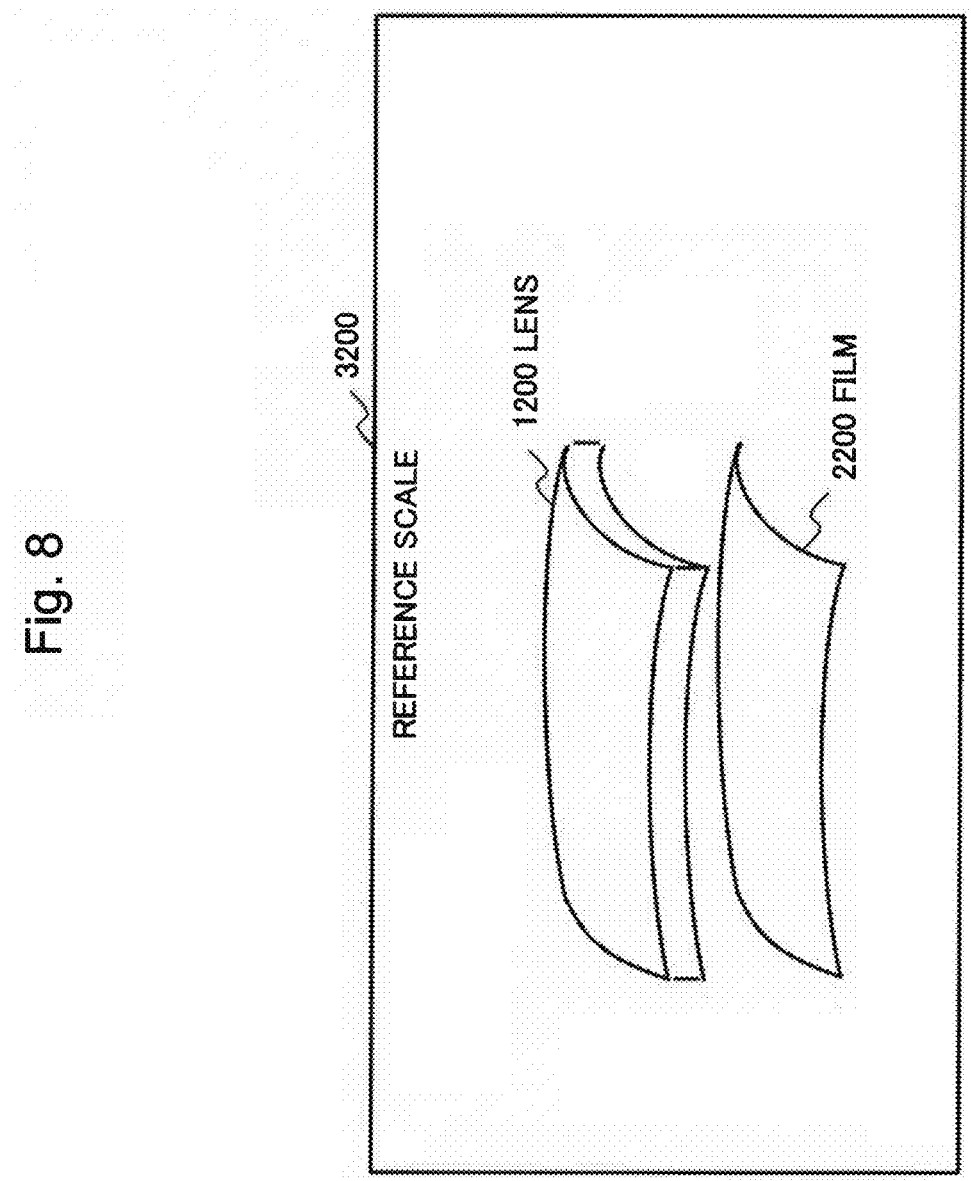
FIG. 8 is a diagram illustrating an example of a configuration of a reference scale according to a third example embodiment according to the present invention.

FIG. 8 is a diagram illustrating an example of the configuration of a reference scale 3200 according to the third example embodiment.

It is assumed that the reference scale 3200 operates in the dimension measurement system 100 like in the first example embodiment.

As illustrated in FIG. 8, the reference scale 3200 according to this example embodiment includes a film 2200 on which a pattern is formed, and a lens 1200 which is attached onto an upper surface of the film 2200. The film 2200 may be disposed at the position of the focal length of the lens 1200 from the optical center thereof. However, the location where the film 2200 is disposed may deviate from the focal length within an allowable range of measurement errors in actual use.

Differences between the reference scale 3000 illustrated in FIG. 1 and the reference scale 3200 in FIG. 8 will be described below. In other words, each of the lens 1200 and the film 2200 of the reference scale 3200 illustrated in FIG. 8 is a curved surface (including a flat surface) having any shape. On the other hand, the pattern function of the film 2200 is a two-variable function defined on the curved surface (including a flat surface).

As described above, according to the reference scale 3200 of this example embodiment, an advantageous effect similar to that of the reference scale 3000 illustrated in FIG. 1 can be obtained, and another advantageous effect that the reference scale can be installed on a curved surface having any shape and the degree of freedom of installation is higher can be obtained.

This is because each of the lens 1200 and the film 2200 of the reference scale 3200 is a curved surface (including a flat surface) having any shape. On the other hand, this is because the pattern function of the film 2200 is a two-variable function defined on a curved surface (including a flat surface).

Fourth Exemplary Embodiment

Next, a fourth example embodiment of the present invention will be described in detail with reference to the drawings.

Figure 9:
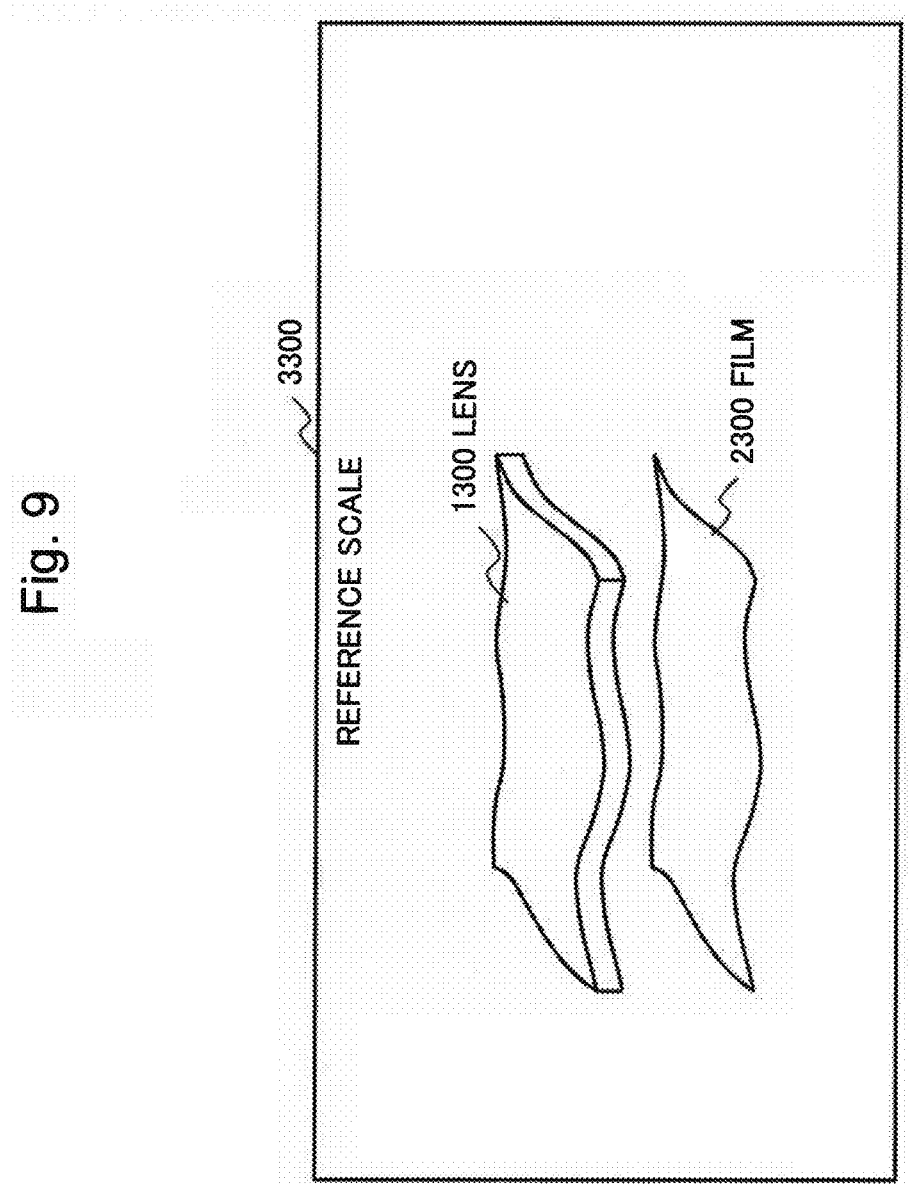
FIG. 9 is a diagram illustrating an example of a configuration of a reference scale according to a fourth example embodiment according to the present invention.

FIG. 9 is a diagram illustrating an example of a configuration of a reference scale 3300 according to the fourth example embodiment.

It is assumed that the reference scale 3300 operates in the dimension measurement system 100 like in the first example embodiment.

As illustrated in FIG. 9, the reference scale 3300 according to this example embodiment includes a film 2300 on which a pattern is formed, and a lens 1300 which is attached onto an upper surface of the film 2300. The film 2300 may be disposed at the position of the focal length of the lens from the optical center thereof. However, the location where the film 2300 is disposed may deviate from the focal length within the allowable range of measurement errors in actual use.

Differences between the reference scale 3200 illustrated in FIG. 8 and the reference scale 3300 in FIG. 9 will be described below. In other words, each of the lens 1300 and the film 2300 of the reference scale 3300 illustrated in FIG. 9 is a curved surface having any shape and is made of a deformable material. On the other hand, the pattern function of the film 2300 is a two-variable function defined on the curved surface (including a flat surface).

As described above, according to the reference scale 3300 of this example embodiment, an advantageous effect similar to that of the reference scale 3200 illustrated in FIG. 8 can be obtained, and another advantageous effect that the reference scale can also be installed on a curved surface that is deformable and the degree of freedom of installation is higher can be obtained. Also, even when the reference scale 3300 according to this example embodiment is installed on a flat surface or a curved surface having a known shape, for example, the reference scale can be carried in a compact folded state, and thus there is also an advantageous effect that the transportation of the reference scale can be simplified.

This is because each of the lens 1300 and the film 2300 of the reference scale 3300 is a curved surface having any shape and is made of a deformable material.

Fifth Exemplary Embodiment

Next, a fifth example embodiment of the present invention will be described in detail with reference to the drawings.

Figure 10:
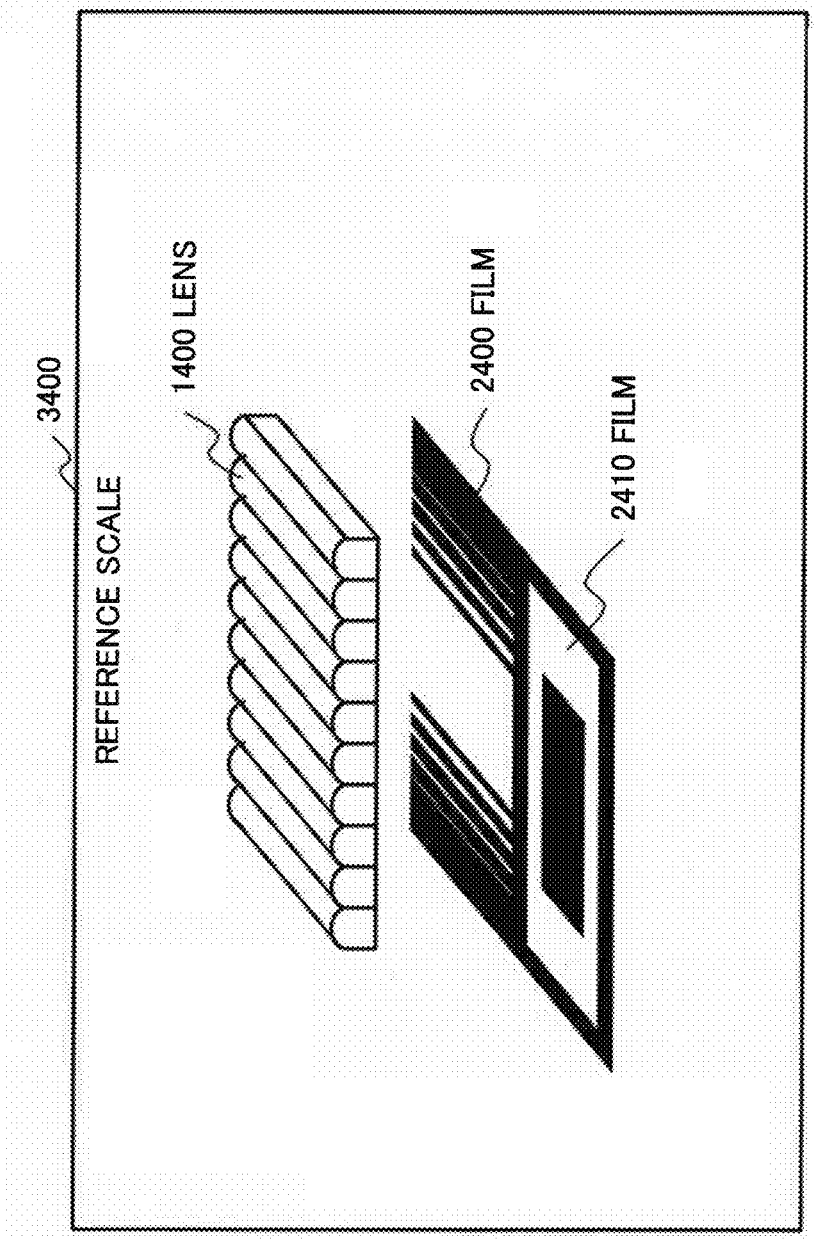
FIG. 10 is a diagram illustrating an example of a configuration of a reference scale according to a fifth example embodiment of the present invention.

FIG. 10 is a diagram illustrating an example of a configuration of a reference scale 3400 according to the fifth example embodiment.

It is assumed that the reference scale 3400 operates in the dimension measurement system 100 like in the first example embodiment.

As illustrated in FIG. 10, the reference scale 3400 according to this example embodiment includes a film 2400 on which the pattern similar to that illustrated in FIG. 1 is formed, a film 2410 (hereinafter referred to as the film 2410 so as to distinguish the film 2410 from the film 2400 on which a pattern for displaying the length reference is formed) on which a region only for a pattern is formed, and a lens 1400 which is attached onto an upper surface of each of the film 2400 and the film 2410. The film 2400 and the film 2410 may be disposed at the position of the focal length of the lens 1400 from the optical center thereof. However, the location where the film 2400 and the film 2410 are disposed may deviate from the focal length within the allowable range of measurement errors in actual use. While a lenticular lens is used as an example of the lens 1400 in FIG. 10, the lens 1400 used for the reference scale 3400 according to this example embodiment is not limited to this.

The reference scale 3400 in FIG. 10 differs from the reference scale 3000 illustrated in FIG. 1 in that the film 2410 is added in the reference scale 3400. For example, a QR (Quick Response) code (registered mark) or an AR (Augmented Reality) marker can be disposed on the film 2410. The QR code can be used as an identification ID by using, for example, the image analysis software. The AR marker can be used to estimate a posture (position, angle) of the plane on which the AR marker is disposed with respect to the imaging device 5000 by using, for example, the image analysis software.

As described above, according to the reference scale 3400 of this example embodiment, an advantageous effect similar to that of the reference scale 3000 illustrated in FIG. 1 can be obtained, and another advantageous effect that additional information can be buried in the reference scale 3400 by using the film 2410 can be obtained. As one example, when a QR code is disposed on the film 2410, an advantageous effect that a plurality of different reference scales 3400 can be identified by using, for example, the image analysis software can be obtained. As another example, when an AR marker is disposed on the film 2410, the AR marker can be used to estimate a posture (position, angle) of the reference scale 3400 with respect to the imaging device 5000 by using, for example, the image analysis software.

This is because the film 2410 is added in the reference scale 3400, and, for example, a QR code or an AR marker can be disposed on the film 2410.

Sixth Exemplary Embodiment

Next, a sixth example embodiment of the present invention will be described in detail with reference to the drawings.

FIG. 11 is a diagram illustrating an example of a configuration of a dimension measurement device 9000 according to the sixth example embodiment. As illustrated in FIG. 11, the dimension measurement device 9000 according to this example embodiment includes a reference scale extraction unit 9100, a measuring object extraction unit 9200, and a dimension calculation unit 9300.

The reference scale extraction unit 9100 utilizes a reference scale which includes a film having a pattern for displaying a length reference, and a lens in contact with the film. The reference scale extraction unit 9100 utilizes the relationship between the pattern function indicating the length reference displayed on the lens according to a change of a predetermined angle formed between the reference scale and the optical axis of the imaging device, and the image formation color function indicating the length reference whose image is formed on the imaging device. Specifically, the reference scale extraction unit 9100 extracts, based on the relationship, an image obtained by forming an image of the length reference from captured image data including the reference scale.

The measuring object extraction unit 9200 extracts the image of the measuring object from the captured image data including the reference scale.

The dimension calculation unit 9300 calculates dimensions of the measuring object based on dimensions of the image obtained by forming an image of the length reference and the image of the measuring object.

As described above, the dimension measurement device 9000 according to this example embodiment provides an advantageous effect that the measurement accuracy can be maintained even when the reference scale is neither disposed nor projected on the measurement surface.

This is because the reference scale extraction unit 9100 extracts the image obtained by forming the image of the length reference from the captured image data including the reference scale based on the relationship between the pattern function indicating the length reference displayed on the lens of the reference scale and the image formation color function indicating the length reference whose image is formed on the imaging device.

While example embodiments of the present invention have been described above with reference to the drawings, the present invention is not limited to the example embodiments described above. The configuration and details of the present invention can be modified in various ways that can be understood by those skilled in the art within the scope of the present invention.

EXAMPLES

In this example, the reference scale and the dimension measurement system according to the first example embodiment were used. Next, experimental results obtained after comparing measurement errors between this example and the reference scale of the related art are described below.

As the reference scale of the related art, a flat plate including a white belt-like region having a width of 10 cm and a height of 5 cm was created at a central portion of a black board having a width of 20 cm and a height of 5 cm. This is referred to as a first reference scale.

As the reference scale 3000 according to the first example embodiment, a reference scale including the lenticular lens (lens pitch $P_L$=2.4 mm, focal length f=2.3 mm, thickness t=2.3 mm) 1000 having a width of 20 cm and a height of 5 cm, and a film 2000 having a pattern below the lenticular lens was created. The pattern function C was designed in such a manner that a white belt-like pattern having a width of 10 cm is observed on a black background. The pattern is attached immediately below the lenticular lens by printing with a resolution of 265 dpi (dots per inch). This reference scale is referred to as a second reference scale.

As the imaging device 5000 used for observation, a camera having a configuration in which a high-resolution lens having a focal length of 75 mm is attached to FL3-U3-32S2M-CS (3,200,000 pixels, pixel size: 2.5 μm, in a square lattice shape) manufactured by PointGray Inc. was used. The distance from the optical center of the camera to the 0th lens of the reference scale was set to 3 m. Focusing was adjusted so as to be focused on the distance plane.

As an evaluation method, the first and second reference scales were observed by changing the first and second reference scales to sight line angles of 0 to 27 (deg), and the pixel width of the white belt-like region was measured. Further, the degree of variation in the width of the white belt-like region when the reference scales were observed at the sight line angle θ was calculated with respect to the width of the white belt-like region when the reference scales were observed at a sight line angle of 0 (deg).

As a result, the width of the white belt-like region when the first reference scale was observed at the sight line angle of 0 (deg) was 1000 (pixels). Next, when the reference scales were observed by changing the sight line angle to 0 to 27 (deg), the width of of the white belt-like region varied most when the reference scales were observed at a sight line angle of 27 (deg), and the width of the white belt-like region was 891 (pixels). When dimensions are measured by using the reference scale having 1000 (pixels)=10 cm as the first reference scale, 12% of measurement errors occur at the sight line angle of 27 (deg).

On the other hand, the width of the white belt-like region when the second reference scale was observed at the sight line angle of 0 (deg) was 1006 (pixels). Next, when the reference scales were observed by changing the sight line angle to 0 to 27 (deg), the width of the white belt-like region varied most and the width was 1023 (pixels). When dimensions are measured by using the reference scale having 1006 (pixels)=10 cm as the second reference scale, 1.7% at maximum of measurement errors occur within an angle range of sight line angles of 0 to 27 (deg).

The above experimental results confirm that an advantageous effect that dimensions can be measured with higher accuracy in the second reference scale than in the first reference scale can be obtained, even when the angle formed between the measurement surface and the reference scale deviates.

The present invention has been described above by using the above-described example embodiments as exemplary examples. However, the present invention is not limited to the example embodiments described above. In other words, the present invention can be applied to various modes that can be understood by those skilled in the art within the scope of the present invention.

This application is based upon and claims the benefit of priority from Japanese patent application No. 2015-145623, filed on Jul. 23, 2015, the disclosure of which is incorporated herein in its entirety by reference.

REFERENCE SIGNS LIST

100 Dimension measurement system
200 Measurement surface
300 Optical axis
400 Optical axis
1000 Lenticular lens
1000A Flat-convex cylindrical lens
1000(0) 0th lens
1000(K) k-th lens
1000($N_L$-1) ($N_L$-1)th lens
1100 Lens
1200 Lens
1300 Lens
1400 Lens
2000 Film
2100 Film
2200 Film
2300 Film
2400 Film
2410 Film
3000 Reference scale
3100 Reference scale
3200 Reference scale
3300 Reference scale
3400 Reference scale
4000 Measuring object
5000 Imaging device
5100 Image formation lens
5200 Sensor surface
6000 Dimension measurement device
6100 Reference scale extraction unit
6200 Measuring object extraction unit
6300 Dimension calculation unit
7000 Storage device
7100 Reference scale dimension storage unit
8000 Display device
9000 Dimension measurement device
9100 Reference scale extraction unit
9200 Measuring object extraction unit
9300 Dimension calculation unit

What is claimed is:

1. A dimension measurement device comprising:
a memory for storing instructions; and
a processor configured to execute the instructions to:
extract an image of a length reference from captured image data including a reference scale, based on a relationship between a pattern function and an image formation color function indicating the length reference whose image is formed on an imaging device, the pattern function indicating the length reference displayed on a lens depending on a change of a predetermined angle formed between an optical axis of the imaging device and the reference scale, the reference scale including a film having a pattern for displaying the length reference and the lens in contact with the film;
extract an image of a measuring object from captured image data including the reference scale; and
calculate dimensions of the measuring object, based on dimensions of the image of the length reference and the image of the measuring object,
wherein:

$$C(x_k - f \tan \theta) = H(u_k);$$

C(x) represents the pattern function;
x represents a position on the reference scale;
H(u) represents the image formation color function;
u represents a position on the image formed on the imaging device;
θ represents the predetermined angle;
f represents a focal length of the lens;
$x_k$ represents an optical center position of a k-th element of the lens on the reference scale; and
$u_k$ represents a position of an image of the k-th element on the image formed on the imaging device.

2. The dimension measurement device according to claim 1, wherein the pattern is a one-dimensional pattern and the lens is a lenticular lens.

3. The dimension measurement device according to claim 1, wherein the pattern is a two-dimensional pattern and the lens is a lens array.

4. The dimension measurement device according to claim 1, wherein the reference scale includes the film and the lens in contact with the film on a curved surface having any shape.

5. The dimension measurement device according to claim 4, wherein the curved surface is formed of a deformable material.

6. A dimension measurement system comprising:
the dimension measurement device according to claim 1;
the measuring object;
the reference scale; and
an imaging device configured to capture images of the measuring object and the reference scale.

7. The dimension measurement device according to claim 1, wherein variation in the length reference displayed on the lens is suppressed by the pattern function of the lens.

8. A dimension measurement method comprising:
extracting an image of a length reference from captured image data including a reference scale, based on a relationship between a pattern function and an image formation color function indicating the length reference whose image is formed on an imaging device, the pattern function indicating the length reference displayed on a lens depending on a change of a predetermined angle formed between an optical axis of the imaging device and the reference scale, the reference scale including a film having a pattern for displaying the length reference and the lens in contact with the film;
extracting an image of a measuring object from captured image data including the reference scale; and
calculating dimensions of the measuring object, based on dimensions of the image of the length reference and the image of the measuring object,
wherein:

$$C(x_k - f \tan \theta) = H(u_k);$$

$C(x)$ represents the pattern function;
x represents a position on the reference scale;
$H(u)$ represents the image formation color function;
u represents a position on the image formed on the imaging device;
$\theta$ represents the predetermined angle;
f represents a focal length of the lens;
$x_k$ represents an optical center position of a k-th element of the lens on the reference scale; and
$u_k$ represents a position of an image of the k-th element on the image formed on the imaging device.

9. The dimension measurement method according to claim 8, wherein the pattern is a one-dimensional pattern and the lens is a lenticular lens.

10. The dimension measurement method according to claim 8, wherein the pattern is a two-dimensional pattern and the lens is a lens array.

11. The dimension measurement method according to claim 8, wherein the reference scale includes the film and the lens in contact with the film on a curved surface having any shape.

* * * * *